Sept. 17, 1929.     A. T. TAYLOR     1,728,311
ELECTRICAL CONVERTING AND MEASURING SYSTEM
Filed Aug. 17, 1927
FIG. 1.
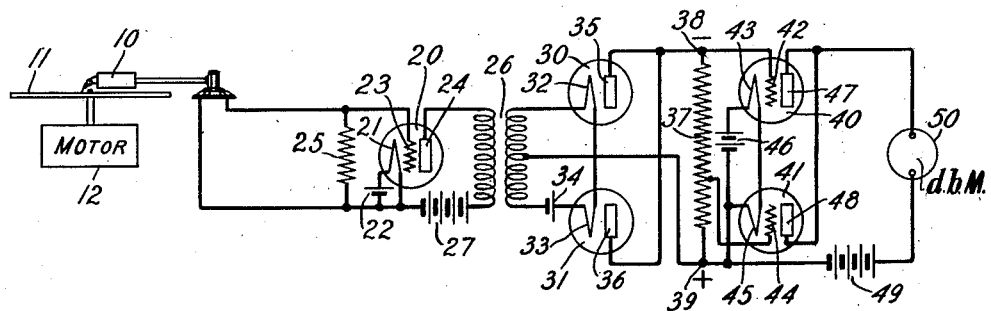
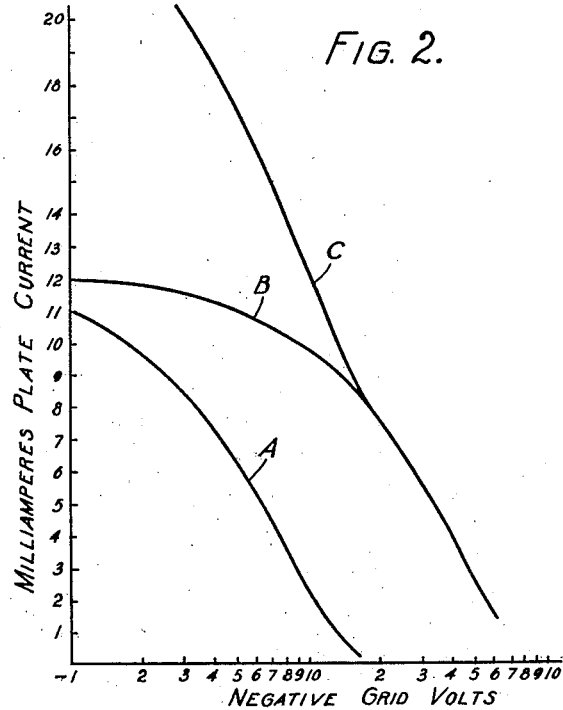
FIG. 2.
INVENTOR:
ALFRED T. TAYLOR
BY Walter C. Kiesel
ATTORNEY Patented Sept. 17, 1929

1,728,311

UNITED STATES PATENT OFFICE

ALFRED T. TAYLOR, OF RICHMOND HILL, NEW YORK, ASSIGNOR TO BELL TELEPHONE LABORATORIES, INCORPORATED, OF NEW YORK, N. Y., A CORPORATION OF NEW YORK

ELECTRICAL CONVERTING AND MEASURING SYSTEM

Application filed August 17, 1927. Serial No. 213,588.

This invention relates to electrical converting and measuring circuits and more particularly to the conversion of linear voltage, or current, variations into exponential voltage or current variations.

An object of the invention is to change linear voltage variations, irrespective of frequency and intensity, into variations which may be measured or recorded directly as decibels.

This invention comprises an arrangement of electron discharge devices having their grids connected across a high resistance and so related that linear voltage variations applied to the grids of the devices produce output variations which change exponentially with the applied voltage variations. This particular arrangement of electron discharge devices will, for the sake of brevity, be referred to hereinafter as a "converter" or "converter devices". The indicating apparatus may be an ammeter or recording meter, connected in the output circuit of the discharge devices. The invention may also be utilized to measure current variations.

The invention is based on the fact that when electron discharge devices are operated over a considerable portion of their negative grid voltage range, the space current of these devices varies substantially exponentially with the impressed voltage and that by combining a number of these devices in accordance with this invention, the exponential variations may be extended over any reasonable range. When a voltage of varying intensity is impressed on the discharge devices, the recording meter may be arranged to produce a characteristic curve showing the efficiency of frequency vs. output voltage, or current directly in decibels. A decibel is defined by the relation $N = 10 \log_{10} P_1/P_2$ where N is the number of decibels by which the powers $P_1$ and $P_2$ differ. This arrangement is particularly desirable in testing the output efficiency at various frequencies of such devices as phonographs, electromagnetic reproducers, acoustic devices, amplifiers, and, in general, all devices operating over the voice frequency range.

A more detailed description of the invention follows and is illustrated in the accompanying drawings.

Fig. 1 shows schematically the arrangement of the circuit for measuring the efficiency of an electromagnetic reproducer in accordance with this invention; and Fig. 2 shows the characteristic plate-current-grid-voltage curves of two individual electron discharge devices and a characteristic plate-current-grid-voltage curve of the two devices associated to act as converters in accordance with this invention.

In the arrangement shown in Fig. 1, selected for illustrating this invention, the varying frequency alternating current is supplied by an electromagnetic phonograph reproducer 10, the efficiency of which is to be tested. The reproducer is associated with a phonograph record 11 having a groove in the form of a sine wave which covers a frequency band which it is desired to measure, say from 5000 to 200 cycles. The record may be rotated at a constant velocity by the driving motor 12. The reproducer playing on, or being actuated by, the record 11 delivers a varying frequency power output, alternating in character, to an amplifier 20, such as an electron discharge device comprising an evacuated vessel containing a cathode 21 which is heated by the battery 22, a control electrode or grid 23, and a plate electrode or anode 24. The grid 23 is connected to one terminal of the reproducer 10, and the other terminal of the reproducer is connected to the cathode 21. A resistance 25 may be connected across the input electrodes of the discharge device 20. The plate electrode 24 is connected to the cathode through the primary winding of an output transformer 26 and battery 27. The amplified alternating current is supplied to a full wave rectifier comprising two discharge devices 30 and 31 having the cathodes 32 and 33 connected to the ends of the secondary winding of transformer 26 and heated by a suitable battery 34. The plate electrodes 35 and 36 of the rectifiers 30 and 31, respectively, are connected in parallel to a terminal 38 of a high resistance 37, while the other terminal 39 of the resistance 37 is connected to the mid-point of the secondary winding of transformer 26. This results in applying a negative potential to the terminal 38 of the resistance 37. The output of the full wave rectifier is a pulsating uni-directional current and this current traversing resistance 37 produces a voltage across the resistance which is proportional in frequency and intensity to the alternating voltage supplied by the electromagnetic reproducer 10.

The rectified voltage is converted in accordance with this invention, by connecting a single electron discharge device, or preferably two similar devices, such as converter devices 40 and 41, across the resistance 37 in such a manner that a negative charge is placed on the grids of these devices to vary the space current exponentially in accordance with the variations of the voltage impressed on the input circuit of the devices. A direct current meter 50, or a recording ammeter, calibrated in decibels may be connected in the output circuit of the converter devices and the resultant current may be indicated over a uniform range in decibels.

It has been found that when electron discharge devices such as the converter devices 40 and 41 are operated over a negative grid voltage range of from zero to a high enough value to practically stop all plate current, the space current varies exponentially over a large part of this range. In the arrangement shown in Fig. 1, the grid 42 of the converter device 40 is connected to the negative terminal of the resistance 37 with the cathode 43 connected to the positive terminal so that the whole voltage across the resistance 37 is impressed on the input circuit of the converter device 40. The grid 44 of the converter device 41 is connected to the resistance 37 at a point approximately twenty percent of the value of the negative potential applied to the grid of the converter device 40. The cathode 45 of the converter device 41 is connected in parallel with the cathode of the converter 40 and a suitable battery 46 heats these cathodes. The plate electrodes 47 and 48 of the devices 40 and 41, respectively, are connected in parallel and attached to one terminal of the decibel meter 50 and the other terminal of the meter is connected to the positive side of battery 49 having its negative terminal connected to the cathodes of the converter devices.

The negative voltage applied to the grids of the converter devices 40 and 41 increases proportionally as the output of the electromagnetic reproducer 10 increases, so that the space current of the converters will also vary accordingly. The converter devices shall carry a sufficiently large plate current at zero grid voltage to cause substantially full scale deflection on the indicating or recording meter 50.

The operation of the converter circuit comprising the resistance 37, the converter devices 40 and 41 and the meter 50 may be understood more clearly by referring to Fig. 2 which shows the characteristic curves of the devices 40 and 41 individually and in combination. These curves are plotted on a semi-logarithmic scale in which negative grid voltage is represented by the abscissæ and the plate current in milliamperes by the ordinates. Curve A represents the curve obtained when using a single converter device, such as the device 40, across the whole of the resistance 37. Approximately the straight line portion of the curve A covers a grid voltage range of about fifteen decibels. Curve B represents the characteristic curve obtained by connecting a device, such as the converter 41 to approximately twenty percent of the full voltage across the resistance 37, while curve C represents the combined output curve of the two converters 40 and 41 connected to the resistance 37 as shown in Fig. 1. This characteristic is substantially a straight line over a much greater negative grid voltage range than for either of the two converters singly, and the two devices combined provide a range of approximately thirty decibels. A further increase of the range and characteristic of the converter circuit may be accomplished by connecting a third device, similar to the converters 40 and 41, to approximately twenty percent of the value of the resistance 37 that the converter 40 is connected to, so that the desired transmission range may be obtained. Additional converter devices may be employed in the converter circuit to obtain a more nearly regular decibel scale.

In the converter circuit shown in Fig. 1, the plate current impressed on the meter 50 will vary as an exponential function of the changes in negative grid potential applied to the converter devices 40 and 41, i. e., the devices are so biased that the plate current is proportional not directly to the grid voltage as in the ordinary thermionic amplifier but rather to the logarithm of the grid voltage so that for continued and equal increments of negative grid voltage the plate current decreases in a logarithmic manner by unequal amounts. Due to the logarithmic relation between currents representing sound and the intensity of the sound, a system of this kind is necessary when sound intensity is to be plotted directly in decibels and the scale is to be in uniform divisions.

While the invention has been described with respect to a particular arrangement for measuring the efficiency of an electromagnetic reproducer, it is understood that various modifications may be made within the scope of the invention. Furthermore, the invention is not limited to the conversion of an alternating current of varying frequency such as is supplied by a phonograph reproducer but may be used to convert a variable direct current impressed on the high resistance of the converter circuit, and is only to be limited within the scope of the appended claims.

What is claimed is:

1. In an electrical measuring system, a source of voltage of variable intensity, a high resistance connected across said source of voltage, a plurality of electron discharge devices having input and output electrodes, and means for connecting the input electrodes to said resistance to vary the combined output of said devices exponentially with respect to the voltage variations applied across said resistance.

2. In an electrical transmitting system, a source of alternating current of variable frequency and intensity, means for rectifying said current, means controlled by said rectified current for producing a direct current which varies substantially exponentially in accordance with the intensity of said alternating current, and means for measuring said direct current.

3. In an electrical transmitting system, a source of alternating current of variable frequency and intensity, means for amplifying said current, means for rectifying said current, means responsive to said rectified current for producing a direct current varying substantially exponentially in accordance with the intensity of said alternating current, and means for indicating the intensity of said direct current.

4. In an electrical measuring system, an electromagnetic element for producing a source of alternating voltage of varying frequency and intensity, means for amplifying said voltage, means for rectifying said voltage, a high resistance connected across the output of said rectifying means, and means comprising a plurality of electron discharge devices connected across said resistance in such a manner that the combined output of said devices varies exponentially in accordance with the voltage variations applied across said resistance.

In witness whereof, I hereunto subscribe my name this 11 day of August, A. D. 1927.

ALFRED T. TAYLOR.